(12) United States Patent
Salter et al.

(10) Patent No.: US 12,435,713 B2
(45) Date of Patent: Oct. 7, 2025

(54) SYSTEMS AND METHODS FOR CONTROLLING VEHICLE AIR COMPRESSOR

(71) Applicant: Ford Global Technologies, LLC, Dearborn, MI (US)

(72) Inventors: Stuart C. Salter, White Lake, MI (US); Brendan Diamond, Grosse Pointe, MI (US); Todd Ansbacher, Westland, MI (US); David Celinske, Wolverine Lake, MI (US); Vyas Darshan Shenoy, Canton, MI (US)

( * ) Notice: Subject to any disclaimer, the term of this patent is extended or adjusted under 35 U.S.C. 154(b) by 181 days.

(21) Appl. No.: 18/360,283

(22) Filed: Jul. 27, 2023

(65) Prior Publication Data

US 2025/0035104 A1 Jan. 30, 2025

(51) Int. Cl.
*F04B 49/02* (2006.01)
*F04B 35/06* (2006.01)
(Continued)

(52) U.S. Cl.
CPC ............ *F04B 49/022* (2013.01); *F04B 35/06* (2013.01); *F04B 41/02* (2013.01); *F04B 49/08* (2013.01); *F04B 2205/05* (2013.01)

(58) Field of Classification Search
None
See application file for complete search history.

(56) References Cited

U.S. PATENT DOCUMENTS

| 2006/0045749 A1* | 3/2006 | Beckman | ............ F04B 49/065 417/1 |
| 2006/0045751 A1* | 3/2006 | Beckman | ............ F04B 41/02 417/44.2 |

(Continued)

FOREIGN PATENT DOCUMENTS

| CN | 107054331 A | 8/2017 |
| CN | 107914696 A | 4/2018 |

(Continued)

OTHER PUBLICATIONS

Minjun Seo et al., Development of Wheel Pressure Control Algorithm for Electronic Stability Control (ESC) Systems of Commercial Trucks, MDPI, Sensors 2018, 18, 2317, Jul. 17, 2018, pp. 1-12.

*Primary Examiner* — Dominick L Plakkoottam
*Assistant Examiner* — Geoffrey S Lee
(74) *Attorney, Agent, or Firm* — Frank Lollo; Eversheds Sutherland (US) LLP

(57) ABSTRACT

A vehicle having an air compressor, an air storage tank and a sensor is disclosed. The air compressor may supply compressed air to the air storage tank, and the air storage tank may supply the compressed air to an external tool. The sensor may be configured to receive information associated with the external tool and send the information to a vehicle processor. The processor may determine tool specification and expected tool usage characteristics based on the information associated with the external tool. The processor may further calculate a target pressure of compressed air in the air storage tank based on the tool specification and the expected tool usage characteristics. Furthermore, the processor may cause air compressor operation to fill the air storage tank with the compressed air at the target pressure.

20 Claims, 5 Drawing Sheets

(51) Int. Cl.
    *F04B 41/02*     (2006.01)
    *F04B 49/08*     (2006.01)

(56) References Cited

U.S. PATENT DOCUMENTS

| | | | | |
|---|---|---|---|---|
| 2006/0045752 | A1* | 3/2006 | Beckman | F04B 49/065 417/44.2 |
| 2009/0288849 | A1* | 11/2009 | Limura | F04B 49/065 173/11 |
| 2010/0158702 | A1* | 6/2010 | Colavincenzo | B60L 50/90 417/364 |
| 2013/0204472 | A1* | 8/2013 | Pfefferl | B60W 20/00 701/22 |
| 2016/0202719 | A1* | 7/2016 | Lippman | B60T 8/3255 74/513 |
| 2020/0247211 | A1* | 8/2020 | Devendran | F16D 61/00 |
| 2021/0107324 | A1* | 4/2021 | Kalyanaraman | B60C 23/06 |
| 2022/0413523 | A1* | 12/2022 | Yan | B01D 53/263 |
| 2023/0193813 | A1* | 6/2023 | Dahl | F04B 35/008 417/46 |
| 2023/0347854 | A1* | 11/2023 | Subramanian | B60T 17/22 |
| 2024/0221437 | A1* | 7/2024 | Knott | G07C 5/008 |
| 2025/0035104 | A1* | 1/2025 | Salter | F04B 35/06 |

FOREIGN PATENT DOCUMENTS

| | | |
|---|---|---|
| CN | 213323059 U | 6/2021 |
| JP | 2008143197 A | 6/2008 |

\* cited by examiner

SYSTEMS AND METHODS FOR CONTROLLING VEHICLE AIR COMPRESSOR

FIELD

The present disclosure relates to a vehicle having an in-built air compressor and more particularly to systems and methods for controlling air pressure and operation of the in-built vehicle air compressor.

BACKGROUND

Many modern vehicles used for off-road or sporting purposes include features that enable users to use their vehicles for a plurality of activities, apart from just transportation. For example, modern trucks or Sport Utility Vehicles (SUVs) enable recreational or utility tools to be connected to the vehicles and powered by vehicle's energy. Further, many modern vehicles include cargo beds or trunk beds that may serve as storage area or shelters during off-road trips.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
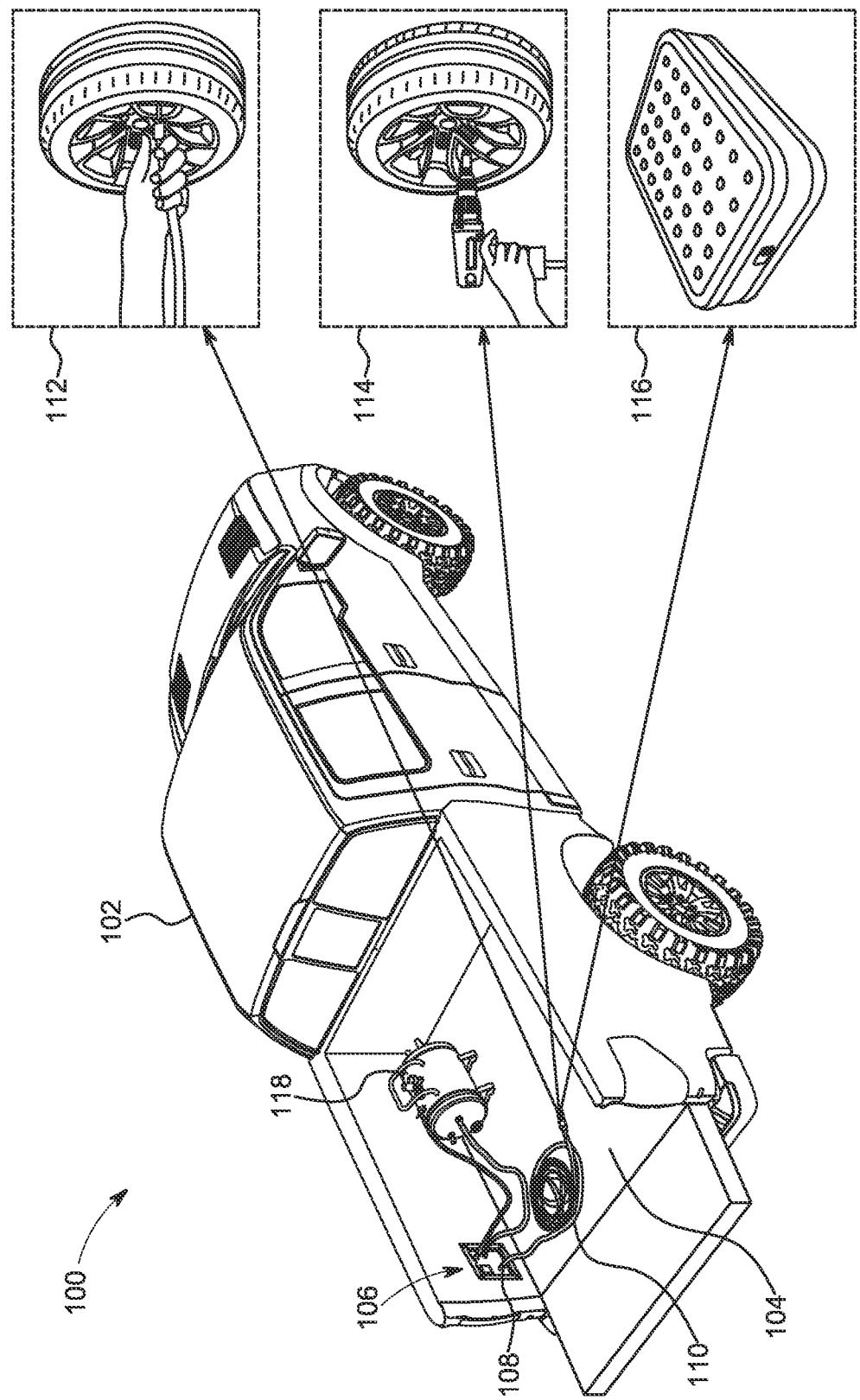
FIG. 1 depicts an exemplary environment in which techniques and structures for providing the systems and methods disclosed herein may be implemented.

The present disclosure describes a vehicle having an in-built air compressor with an air storage tank. The air compressor may be configured to supply compressed air that may be used to operate an external tool to perform one or more operations, e.g., inflating/deflating tires, operating a power tool, cleaning debris, and/or the like. The vehicle may include an air compressor control system ("system") that may be configured to control air compressor operation based on a type of external tool that may be operated using the compressed air and an operation being performed by a user using the external tool.

The vehicle may include a user interface panel into which the user may connect the external tool. The user interface panel may be in fluid communication with the air storage tank that may be configured to store the compressed air received from the air compressor. In operation, the air compressor may supply the compressed air to the air storage tank, which may in turn supply the compressed air to the external tool via the user interface panel. Further, the system may be communicatively connected with the air compressor via wired or wireless connection, thereby enabling the system to control the air compressor operation.

When the user connects the external tool to the user interface panel and activates the air compressor (e.g., by sending an activation command via a user device, a vehicle infotainment system, gesture command, audio command, etc.), the system may determine information associated with the external tool and the operation being performed by the user. The information associated with the external tool and the operation may include, for example, tool specification, maximum/minimum operating pressure, a desired operating pressure range, etc. The system may determine the information described above based on user inputs, images captured by vehicle cameras, radar sensors, lidar sensors, etc., and/or details associated with a plurality of tools and tool operations stored in a system memory or an external server.

Responsive to determining the information associated with the external tool and the operation being performed by the user, the system may calculate an initial air pressure of compressed air in the storage tank (or storage tank pressure). In some aspects, the initial air pressure may be a sum of the maximum operating pressure and a predefined buffer pressure value. Responsive to calculating the initial air pressure, the system may cause the air compressor operation to fill the storage tank with the compressed air at the initial air pressure.

During tool operation, the system may continuously monitor real-time tool usage pressure (i.e., the air pressure at which the external tool may be operating) and may increase or decrease the buffer pressure value based on the real-time tool usage pressure to ensure that the external tool operates with close to 100% uptime (e.g., 99+% uptime). Specifically, the system may compare the real-time tool usage pressure with the desired operating pressure range and may increase the buffer pressure value when the system determines that the external tool may be operating below the desired operating pressure range. Similarly, the system may decrease the buffer pressure value (e.g., to conserve vehicle energy) when the system determines that the external tool may be operating within the desired operating pressure range and achieving more than 99.5% uptime.

The system may be further configured to continuously monitor storage tank pressure when the external tool may be attached to the user interface panel and calculate a difference between the storage tank pressure and the desired operating pressure range. The system may cause the air compressor to operate at full capacity when the system determines that the difference may be less than a predefined threshold. The system may be further configured to output an alert notification when the system determines that the external tool may be operating below the desired operating pressure range even after causing the air compressor to operate at full capacity. In some aspects, the system may output the alert notification by illuminating or flashing the exterior vehicle lights.

The present disclosure discloses a system and method to control an in-built vehicle air compressor. With the in-built vehicle air compressor, the user may not be required to carry and use a separate portable air compressor to operate the external tool, thus enhancing user convenience. Further, the system controls the air compressor operation such that the external tool may operate with close to 100% uptime. Furthermore, the system provides timely notification to the user when the vehicle air compressor may not be able to meet external tool's pressure requirements, thus enhancing user experience of using the vehicle air compressor.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a vehicle 102 that may take the form of any passenger or commercial vehicle such as, for example, a car, a work vehicle, a crossover vehicle, a truck, a van, a minivan, a taxi, a bus, etc. In the exemplary aspect depicted in FIG. 1, the vehicle 102 is a truck. The vehicle 102 may be a manually driven vehicle and/or may be configured to operate in a partially autonomous mode and may include any powertrain such as, for example, a gasoline engine, one or more electrically-actuated motor(s), a hybrid system, etc.

The vehicle 102 may include a truck bed 104 that may be configured to store one or more objects, equipment, etc. The vehicle 102 may further include an air compressor (shown as air compressor 210 in FIG. 2) with a built-in or attached buffer tank or an air storage tank (shown as storage tank 212 in FIG. 2). The air compressor may supply compressed air to the air storage tank when the air compressed may be operational/powered, and the air storage tank may be configured to store the compressed air supplied by the air compressor. In some aspects, the air compressor and the air storage tank may be packaged under the truck bed 104 or inside a truck bed side wall. In other aspects, the air compressor and the air storage tank may be packaged at any other location in the vehicle 102. The air compressor may be powered by using vehicle's energy (e.g., vehicle's battery energy or energy/power drawn from vehicle engine).

The air compressor and the air storage tank may be in fluid communication with a panel 106 (or a user interface console) that may be installed on the vehicle 102. In the exemplary aspect depicted in FIG. 1, the panel 106 is installed on a truck bed side wall. The panel 106 may receive compressed air from the air storage tank and may supply the compressed air to external tools, accessories, etc. A user (not shown) may connect an external tool/accessory with the panel 106 to receive the compressed air from the air storage tank.

Specifically, an outlet 108 of the panel 106 may be attached to a conduit 110 that may supply the compressed air from the air storage tank. The user may attach an external tool/accessory to the conduit 110 to receive the compressed air from the air storage tank to perform one or more tasks. For example, the user may inflate or deflate a tire by using the compressed air, as shown in view 112 in FIG. 1. Further, the user may use a power tool (e.g., a nail gun) by using the compressed air, as shown in view 114. Furthermore, the user may use the compressed air to inflate an air mattress, as shown in view 116. Use case examples depicted in FIG. 1 are for illustrative purposes and should not be construed as limiting the present disclosure scope. The user may use the compressed air received from the air storage tank for a plurality of other activities (e.g., cleaning debris, operating a wrench, etc.) that is not depicted in FIG. 1.

In some aspects, the vehicle 102 may further include a compressor control system (shown as compressor control system 218 in FIG. 2) that may control air compressor operation based on a type of external tool connected by the user to the outlet 108 (via the conduit 110) and a type of operation being performed by the user using the external tool. Specifically, the compressor control system ("system") may control the air compressor operation to increase or decrease pressure of compressed air in the air storage tank (and hence increase or decrease tank pressure) based on the tool type and the type of operation being performed by the user, e.g., filling up tires or an air mattress, operating a high powered air tool, etc. For example, the system may cause the air compressor operation to fill the air storage tank with the compressed air at a pressure of 140-160 Pound-force per square inch (psi) when the user may be using a 70 psi/5 cubic feet per minute (cfm) tool such as an air sander that may be expected to operate for a relatively longer time duration. On the other hand, the system may cause the air compressor operation to fill the air storage tank with the compressed air at a relatively lower pressure when the user may be filling up tires, which may require tool operation for a short time duration. The process of controlling air compressor operation based on tool and operation type is described later in detail below in conjunction with FIG. 2.

In some aspects, the system may determine the tool type and the type of operation being performed by the user based on inputs provided by the user. For example, the user may input information associated with the tool type and the type of operation on a vehicle infotainment system or a user device, which may transmit the information to the system. In other aspects, the system may determine the tool type and the type of operation on its own by using one or more vehicle sensors. For example, the system may use exterior vehicle cameras, Radio Detection and Ranging (radar) sensors, Light Detection and Ranging (Lidar) sensors, and/or the like, and image processing algorithms to determine the tool that may be attached by the user to the panel 106 and the type of operation being performed.

In additional aspects, the system may enable the user to optionally connect one or more external storage tanks 118 to the panel 106 to receive and/or provide the compressed air. The user may connect the external storage tank 118 to the panel 106 when, for example, the user may be in need of additional amount of compressed air (over and above the amount of compressed air that the in-built air storage tank may provide). In some aspects, the system may control flow of compressed air to/from the external storage tank 118, in addition to controlling the air compressor operation.

Functions details of the system are described below in conjunction with FIG. 2.

The vehicle 102 and/or the user may implement and/or perform operations, as described here in the present disclosure, in accordance with the owner manual and safety guidelines.

Figure 2:
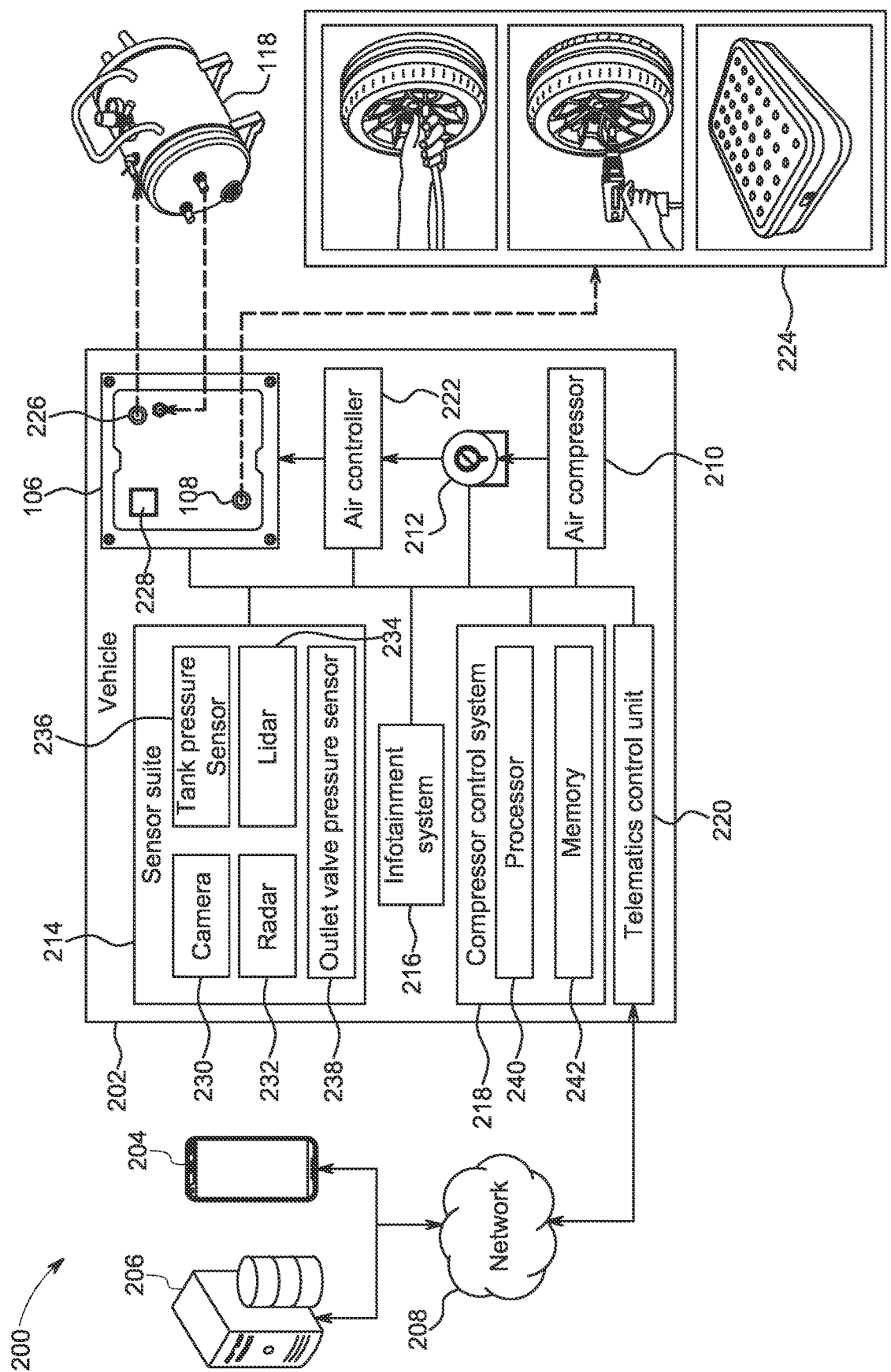
FIG. 2 depicts a block diagram of an exemplary system to control operation of a vehicle air compressor in accordance with the present disclosure.

FIG. 2 depicts a block diagram of a system 200 to control operation of a vehicle air compressor in accordance with the present disclosure. While describing FIG. 2, references may be made to FIG. 3.

The system 200 may include a vehicle 202, which may be same as the vehicle 102 described above in conjunction with FIG. 1. The system 200 may further include a user device 204 and one or more server(s) 206 communicatively coupled with the vehicle 202 via one or more network(s) 208. The user device 204 may be associated with a vehicle user and may include a mobile device, a tablet, a laptop, a smart watch, or any other device with communication capabilities.

The server 206 may be configured to store information associated with a plurality of tools and a plurality of operations that may be performed by using the tools. The tools may include, but are not limited to, nail guns, air brushes, wrenches, tire inflators, and/or the like. The operations that may be performed by using the tools may include, but are not limited to, inflating air mattresses, inflating and/or deflating tires, blowing debris, winterization, and/or the like. In some aspects, the information associated with the plurality of tools and operations stored in the server 206 may include tool specification (corresponding to different brands, models, etc. of tools) and expected tool usage characteristics associated with each tool for different types of operations. The tool specification may include, for example, expected maximum cfm and desired operating pressure range (maximum, minimum and/or acceptable) associated with the tool. The expected tool usage characteristics may include, for example, desired operating pressure range (maximum, minimum and/or acceptable) associated with each tool for the different types of operations, an expected time duration each tool may operate for different types of operations (e.g., sustained usage or quick transient), and/or the like. In some aspects, the server 206 may transmit the information associated with the plurality of tools and the plurality of operations to the vehicle 202 at a predefined frequency. In other aspects, the server 206 may transmit the information to the vehicle 202 when the vehicle 202 sends a request to the server 206 seeking the information.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an air compressor 210 having an in-built or an attached storage tank 212, a sensor suite 214, an infotainment system 216, a compressor control system 218, a telematics control unit (TCU) 220, an air controller 222 and the panel 106. The plurality of units may be communicatively coupled with each other via wired (e.g., via a bus) or wireless communication connections. As described above in conjunction with FIG. 1, the user may optionally attach the external storage tank 118 to the panel 106, when the user requires additional compressed air.

As described above in conjunction with FIG. 1, the air compressor 210 may be configured to supply compressed air to the storage tank 212 at a predefined pressure. The storage tank 212 may receive the compressed air from the air compressor 210 and may store the compressed air, which may be provided to an external tool via the outlet 108 based on tool usage requirements (as shown in view 224 of FIG. 2). In some aspects, the compressor control system 218 (or system 218) may control flow of compressed air from the storage tank 212 to the external tool by using the air controller 222. Specifically, the air controller 222 may receive inputs from the system 218 to control the flow of compressed air from the storage tank 212 to the outlet 108, and hence to the external tool.

The panel 106 may include a plurality of components including, but not limited to, the outlet 108, external tank outlet and inlet 226, a display 228, one or more air pressure knobs/buttons, start/stop buttons, a power socket (not shown), and/or the like. The external tank outlet and inlet 226 may enable the user to connect the external storage tank 118 with the panel 106. The display 228 may display operational parameters of the air compressor 210 and/or the storage tank 212 (e.g., air pressure, cfm, etc.). The start/stop buttons may enable the user to manually start or stop air compressor operation, and the air pressure knobs/buttons may enable the user to input a desired air pressure. The power socket may be used by the user to power any external device (if required).

In some aspects, the user may additionally start/stop the air compressor operation and provide additional air compressor operational inputs to the vehicle 202 via the infotainment system 216 and/or the user device 204 (that may transmit the inputs to the vehicle 202 via the network 208). For example, the user may input the desired air pressure and/or an air compressor operational mode on the infotainment system 216 and/or the user device 204. The air compressor operational mode may include, for example, an inflation mode in which the user may input a target air pressure and the air supply from the storage tank 212 may automatically shut off by the system 218 (via the air controller 222) when the target air pressure may be reached. As another example, the air compressor operational mode may include a continuous air mode in which the compressed air may be continuously provided from the storage tank 212 to the external tool, and the user may control the air pressure via the air pressure knobs/buttons.

In additional aspects, the user may provide details of the external tool (e.g., model, brand, and/or specification) and/or the operation being performed by the user (e.g., inflating air mattresses, inflating and/or deflating tires, blowing debris, winterization, and/or the like) to the vehicle 202 via the infotainment system 216 and/or the user device 204.

The TCU 220 may be configured and/or programmed to provide vehicle connectivity to wireless computing systems onboard and off board the vehicle 202 and may include a Navigation (NAV) receiver for receiving and processing a GPS signal, a BLE® Module (BLEM), a Wi-Fi transceiver, a UWB transceiver, and/or other wireless transceivers (not shown in FIG. 2) that may be configurable for wireless and cellular communication between the vehicle 202 and other systems (e.g., the user device 204, the server 206, etc.), computers, and modules. The TCU 220 may also enable the system 218 to wirelessly connect (e.g., via BLE or UWB) with one or more vehicle components, e.g., the panel 106, the air compressor 210, the air controller 222, the sensor suite 214, and/or the like.

The sensor suite 214 may include one or more sensors including, but not limited to, interior/exterior/Center High Mounted Stop Lamp (CHMSL) cameras 230, radar sensor(s) 232, lidar sensor(s) 234, a tank pressure sensor 236, an outlet valve pressure sensor 238, temperature sensors, weight sensors (not shown), and/or the like. In some aspects, the tank pressure sensor 236 may be configured to measure a real-time air pressure in the storage tank 212 and outlet valve pressure sensor 238 may be configured to measure real-time tool usage air pressure at which the external tool may be operating (or the pressure of compressed air output from the outlet 108). In some aspects, the infotainment system 216 may be part of the sensor suite 214. In other aspects, the infotainment system 216 may be separate from the sensor suite 214, as shown in FIG. 2.

In some aspects, the system 218 may be part of a vehicle automotive computer (not shown) and may be installed in a vehicle engine compartment (or elsewhere in the vehicle 202). The system 218 may include one or more processor(s) 240 and a memory 242.

The processor(s) 240 may be disposed in communication with one or more memory devices disposed in communication with the respective computing systems (e.g., the memory 242 and/or one or more external databases not shown in FIG. 2). The processor(s) 240 may utilize the memory 242 to store programs in code and/or to store data for performing aspects in accordance with the disclosure. The memory 242 may be a non-transitory computer-readable memory storing an air compressor control program code. The memory 242 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 242 may be configured to store inputs received from the sensor suite 214, the infotainment system 216 and the user device 204. The memory 242 may be further configured to store information associated with the plurality of power tools and the plurality of operations that the vehicle 202 may receive from the server 206, as described above.

The system architecture of the vehicle 202, as depicted in FIG. 2, may omit certain computing, electronics and/or mechanical modules. It should be readily understood that the architecture depicted in FIG. 2 is an example of a possible implementation according to the present disclosure, and thus, it should not be considered limiting or exclusive.

In operation, the user may activate the start button included in the panel 106, or provide an air compressor activation command via gesture control, touchscreen command or audio command to the user device 204 or the infotainment system 216 to activate the air compressor 210. Responsive to the user performing the action described above, the panel 106, the user device 204 or the infotainment system 216 may transmit a trigger signal to the processor 240. The trigger signal may indicate to the processor 240 that the user desires to operate the air compressor 210.

The processor 240 may obtain the trigger signal and may initiate an air compressor information identification process responsive to obtaining the trigger signal. Specifically, responsive to obtaining the trigger signal, the processor 240 may power ON the air compressor 210 and may use wired or wireless communication with the air compressor 210 to determine air compressor model number, capabilities, etc. In addition, the processor 240 may fetch inputs from the sensor suite 214 (specifically the cameras 230 and/or the radar sensors 232) to determine storage tank size (if not received directly from the air compressor 210 via the wired or wireless communication). The processor 240 may additionally use the inputs obtained from the sensor suite 214 to determine if the external storage tank 118 is attached to the panel 106. The processor 240 may further determine an external storage tank size by using the inputs obtained from the sensor suite 214, when the external storage tank 118 may be attached to the panel 106. In an exemplary aspect, the processor 240 may use one or more image processing algorithms (that may be pre-stored in the memory 242) and images of the storage tank 212 and/or the external storage tank 118 obtained from the cameras 230 to determine sizes of the storage tank 212 and/or the external storage tank 118.

Although the description above describes an aspect where the processor 240 determines the compressor model number, capabilities, etc. and the storage tank size by using inputs from the sensor suite 214 or via wired/wireless communication with the air compressor 210, in some aspects, such capability and size information may be pre-stored in the memory 242. In this case, the processor 240 may fetch the capability and size information from the memory 242, responsive to receiving the trigger signal. In some aspects, the capability and size information may include, for example, a maximum air pressure that the air compressor 210 can deliver, storage tank capacity (volume, maximum pressure, etc.), and/or the like.

In additional aspects, responsive to obtaining the trigger signal, the processor 240 may establish a wireless connection (e.g., via the TCU 220) or a wired connection (e.g., via Controller Area Network (CAN) or Local Interconnect Network (LIN) bus) with the air compressor 210 and the air controller 222 to control air compressor operation (e.g., to control pressure of air in the storage tank 212) and flow of compressed air from the air compressor 210 and/or the storage tank 212.

Responsive to activating the air compressor 210 and the processor 240 establishing the wired/wireless connection with the air compressor 210 and the air controller 222 as described above, the user may connect the external tool with the outlet 108. In some aspects, the user may additionally input details of the operation that the user may perform with the external tool, e.g., filling up tires or air mattress, using a high powered air tool, etc., and tool details (e.g., tool specification, brand, model, etc.). In some aspects, the user may input the operation and tool details on user interfaces of the user device 204 or the infotainment system 216, and the processor 240 may obtain the inputs from the user device 204 or the infotainment system 216.

In other aspects, the processor 240 may obtain inputs from the sensor suite 214 (e.g., inputs from the cameras 230, the radar sensor 232 and/or the lidar sensor 234) and determine a type of the external tool connected to the outlet 108 and the details of the operation being performed by using the obtained inputs. For example, the processor 240 may obtain images of the external tool and the operation being performed from the cameras 230 and may execute one or more image processing algorithms (that may be pre-stored in the memory 242) to determine a type, brand, model, etc. of the tool being connected to the outlet 108 and the operation details (e.g., whether the user may be filling up tires or air mattress, using a high powered air tool, etc.).

In yet another aspect, when the user connects the external tool with the outlet 108 and links the external tool wirelessly with the vehicle 202, the external tool may transmit tool details (e.g., tool specification, brand, model, etc.) to the vehicle 202/processor 240.

In yet another aspect, if the processor 240 obtains the tool brand and/or model from one of the methods described above, the processor 240 may determine the tool specification (e.g., maximum cfm and desired operating pressure range) by using a tool data structure that may be stored in the memory 242 or the server 206. In this case, the tool data structure may include tool specifications associated with a plurality of tools. The processor 240 may correlate the obtained tool brand and/or model with tool brands and models included in the tool data structure to determine the external tool specification.

In a similar manner, when the processor 240 determines the operation details (e.g., whether the user is filling up tires or air mattress, using a high powered air tool, etc.) based on the images obtained from the cameras 230 or the user inputs, the processor 240 may determine expected tool usage characteristics associated with the tool and the operation by using the information associated with the plurality of power tools and the plurality of operations that the server 206 may provide to the vehicle 202/processor 240, as described above. As described above, the expected tool usage characteristics may include, for example, a desired operating pressure range (maximum, minimum and/or acceptable) associated with the tool for the determined operation, an expected operation time duration, and/or the like.

Responsive to determining the tool brand, model, specifications, etc. and the details of the operation being performed by the user (e.g., the expected tool usage characteristics) by one or more methods described above, the processor 240 may calculate an optimum expected air pressure (or first target pressure) of compressed air that may be stored in the storage tank 212 when the user commences operating the external tool.

Specifically, the processor 240 may use the tool specifications and the expected tool usage characteristics to determine a maximum operating pressure associated with the external tool for the operation being performed by the user. In an exemplary aspect, the maximum operating pressure may be higher for grinding or drilling operation (i.e., sustained expected tool usage) and may be lower for inflating a tire (i.e., quick transient expected tool usage). Further, the processor 240 may determine a predefined buffer pressure (e.g., a predefined first buffer pressure) based on the expected tool usage characteristics. For example, for an expected tool usage requiring sustained drilling, cutting, sanding, etc., the predefined first buffer pressure may be higher (e.g., in a range of 40-60 psi). On the other hand, for a quick transient expected tool usage, the predefined first buffer pressure may be lower (e.g., in a range of 10-20 psi). In some aspects, the processor 240 may use a mapping of a plurality of predefined buffer pressures with tool usage characteristics (that may be pre-stored in the memory 242) to determine the predefined first buffer pressure based on the determined expected tool usage characteristics.

Although the description above describes an aspect where the predefined first buffer pressure may be based on (or varies based on) the expected tool usage characteristics, in some aspects, the predefined first buffer pressure may be a predefined percentage (e.g., 10% or 20%) of the maximum operating pressure associated with the external tool for the operation being performed by the user.

Responsive to determining the maximum operating pressure and the predefined first buffer pressure, the processor 240 may determine/calculate the first target pressure by adding the predefined first buffer pressure to the maximum operating pressure. The processor 240 may then cause the air compressor operation to fill the storage tank 212 with compressed air at the first target pressure when the user commences operating the external tool. In this manner, the processor 240 ensures that the storage tank pressure (i.e., pressure of air in the storage tank 212) is higher than the maximum operating pressure.

By causing the air compressor 210 to fill the storage tank 212 with the compressed air at a pressure higher than the maximum operating pressure (i.e., by adding the predefined first buffer pressure to the maximum operating pressure), the processor 240 ensures that the air compressor 210/storage tank 212 optimally meet user's tool usage requirements, without any downtime. A person ordinarily skilled in the art may appreciate that if the tank pressure drops, or if the air compressor 210 is not able to meet tool's pressure requirements, the user may not be able to perform the desired operation with the external tool in an optimum manner (and may experience downtime). The processor 240 eliminates or significantly reduces probability of downtime by adding the predefined first buffer pressure to the maximum operating pressure of the external tool for the expected tool usage. In addition, as the user operates the external tool, the processor 240 may increase or decrease the buffer pressure to ensure that the user gets an uptime close to 100% (e.g., 99+%) based on desired operating pressure range of the external tool for the expected tool usage, as described below.

When the user uses the external tool, the processor 240 may continuously (or at a predefined frequency) obtain the real-time tool usage air pressure from the outlet valve pressure sensor 238 and may compare the real-time tool usage air pressure with the desired operating pressure range (that may be part of the expected tool usage characteristics, as described above). The processor 240 may increase the predefined first buffer pressure when the processor 240 determines that the real-time tool usage air pressure may be continuously (or for more than a predefined time duration) less than the desired operating pressure range. Stated another way, the processor 240 may increase the predefined first buffer pressure when the processor 240 determines that the external tool may be continuously operating below the desired operating pressure range.

The processor 240 may increase the predefined first buffer pressure to ensure that the air pressure in the storage tank 212 (or the storage tank pressure) is high enough to enable optimum external tool operation. Specifically, the processor 240 may increase the first target pressure by a first predefined pressure value to a second pressure, responsive to determining that the real-time tool usage air pressure may be continuously less than the desired operating pressure range. The processor 240 may then cause the air compressor operation to fill the storage tank 212 with compressed air at the second pressure. In some aspects, the first predefined pressure value may be a preset pressure value that may be stored in the memory 242. In other aspects, the first predefined pressure value may be a predefined percentage of the predefined first buffer pressure.

Responsive to increasing the first target pressure to the second pressure, the processor 240 may again continuously obtain the real-time tool usage air pressure from the outlet valve pressure sensor 238 and may compare the real-time tool usage air pressure with the desired operating pressure range. The processor 240 may further increase the second pressure by a second predefined pressure value to a third pressure, responsive to determining that the real-time tool usage air pressure may be still less than the desired operating pressure range even after filling the storage tank 212 with the compressed air at the second pressure. Stated another way, the processor 240 may increase the second pressure to the third pressure when the processor 240 determines that the external tool may be continuously operating below the desired operating pressure range. Responsive to increasing the second pressure to the third pressure, the processor 240 may cause the air compressor operation to fill the storage tank 212 with the compressed air at the third pressure.

In a similar manner, the processor 240 may iteratively cause the air compressor 210 to increase the pressure of compressed air in the storage tank 212 (up to the maximum pressure of the storage tank 212) till the processor 240 determines that the external tool is operating within the desired operating pressure range for 99+% of time. Stated another way, the processor 240 may iteratively increase the pressure of compressed air in the storage tank 212 till the external tool operates with 99+% uptime.

In further aspects, the processor 240 may decrease the pressure of compressed air (i.e., decrease the predefined buffer pressure) in the storage tank 212 when the processor 240 determines that the external tool may be operating with close to 100% (e.g., 99.5+%) uptime. Specifically, when the processor 240 determines that the real-time tool usage air pressure may be within the desired operating pressure range for more than a predefined time duration (e.g., more than 99.5% of tool operation time duration) when the storage tank may be filled with the compressed air at the second or third pressure, the processor 240 may decrease the second or third pressure by a third predefined pressure value to a fourth pressure. The processor 240 may then cause air compressor operation to fill the storage tank 212 with compressed air at the fourth pressure.

For example, in certain instances, the real time tool usage air pressure may be within the desired operating pressure range for more than a predefined percentage of operating time (i.e. 99% of the time while the tool is in use, the operating pressure is within the ideal pressure range).

A person ordinarily skilled in the art may appreciate that the processor 240 decreases the storage tank pressure (specifically causes reduced air compression operation) to conserve vehicle energy.

In the manner described above, the processor 240 may increase or decrease the buffer pressure to ensure that the storage tank pressure (or the pressure of compressed air in the storage tank 212) is enough to enable tool operation with 99+% uptime. The processor 240 may additionally store the buffer pressure value (e.g., an "optimum" buffer pressure) associated with the operating tool and the operation being performed by the user at which the external tool may be operating with 99+% uptime in the memory 242 for storage purpose. The processor 240 may reference the stored optimum buffer pressure and cause the air compressor operation based on the optimum buffer pressure when the user may use the same tool and perform the same operation in the future. The processor 240 may additionally transmit the optimum buffer pressure value to the server 206 (via the TCU 220), so that other vehicles that may be part of a vehicle fleet may reference the optimum buffer pressure value when a tool similar to the external tool may be connected to the vehicles for performing similar operations.

In additional aspects, the processor 240 may continuously (or at a predefined frequency) obtain real-time storage tank pressure (or the real-time air pressure in the storage tank 212) from the tank pressure sensor 236 when the user may be operating the external tool. Responsive to obtaining the real-time storage tank pressure, the processor 240 may calculate a difference between the real-time storage tank pressure and the desired operating pressure range (e.g., an average of the desired operating pressure range or a minimum pressure of the desired operating pressure range). The processor 240 may cause the air compressor 210 to operate at full capacity when the processor 240 determines that the calculated difference may be less than a predefined threshold. In some aspects, the predefined threshold may vary based on tool specification and the operation being performed by the user using the external tool. In other aspects, the predefined threshold may be a preset value (e.g., 25, 30 or 35 psi) that may be per-stored in the memory 242. In yet another aspect, the predefined threshold may be predefined percentage of the desired operating pressure range.

A person ordinarily skilled in the art may appreciate that the processor 240 causes the air compressor 210 to operate at full capacity when the real-time storage tank pressure drops below the predefined threshold to ensure that the user does not experience any downtime while operating the external tool.

In further aspects, responsive to causing the air compressor 210 to operate at full capacity, the processor 240 may obtain the real-time tool usage air pressure from the outlet valve pressure sensor 238 and may compare the real-time tool usage air pressure with the desired operating pressure range. The processor 240 may output an alert notification when the processor 240 determines that the real-time tool usage air pressure is less than the desired operating pressure range even when the air compressor 210 may be operating at full capacity. Stated another way, the processor 240 may output the alert notification when the processor 240 determines that the external tool may be operating below the desired operating pressure range even when the air compressor 210 may be operating at full capacity.

Figure 3:
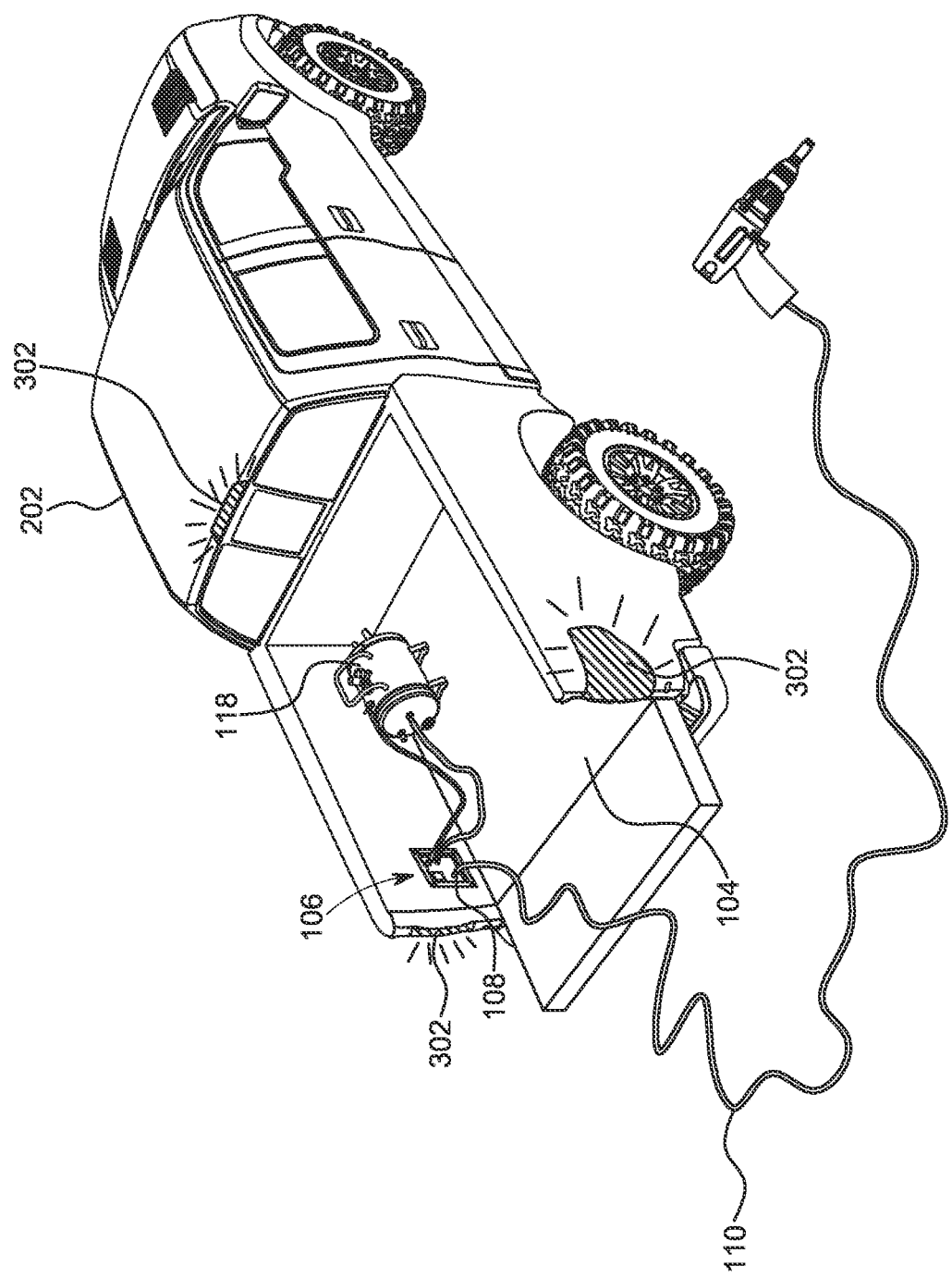
FIG. 3 depicts an embodiment to output an alert notification from a vehicle in accordance with the present disclosure.

In some aspects, the processor 240 may output the alert notification by causing vehicle exterior lights (e.g., brake lights, CHMSL lights, rear or side display lights, trunk bed RGB lights, and/or the like) to illuminate or flash in a predefined pattern or color, as shown in FIG. 3 (with lights 302 illuminating). For example, the vehicle lights may illuminate in red color when the external tool may be operating below the desired operating pressure range. In additional aspects, the vehicle lights may illuminate in yellow color when the external tool may be operating close to the desired operating pressure range and may illuminate in green color when the external tool may be operating within the desired operating pressure range. In other aspects, the processor 240 may output the alert notification by transmitting, via the TCU 220, the notification to the user device 204 and/or the infotainment system 216. The notification may indicate to the user that the air compressor 210 may not be able to meet external tool's usage requirements.

In further aspects of the present disclosure, the processor 240 may obtain the real time tank pressure at a predefined frequency (e.g., routinely) even when the external tool may not be connected to the outlet 108. The processor 240 may output a leak notification when the processor 240 determines that the real time tank pressure may be less than a predefined tank pressure threshold (that may vary with ambient temperature). The processor 240 may output the leak notification by transmitting, via the TCU 220, the leak notification to the user device 204 and/or the infotainment system 216. The leak notification may indicate to the user that there may potentially be a leak in the air compressor 210 and/or the storage tank 212, and hence maintenance may be required.

Figure 4:
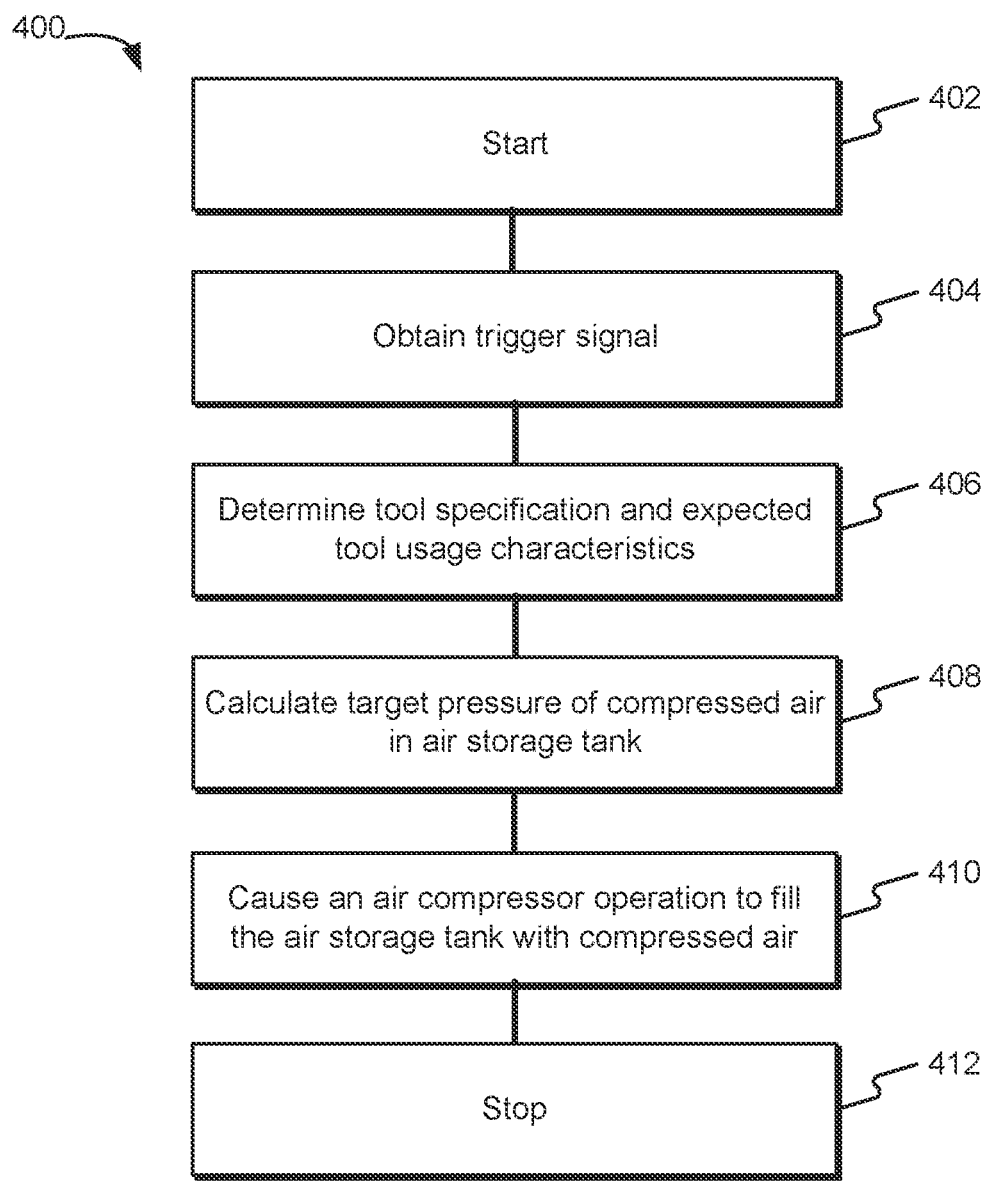
FIG. 4 depicts a flow diagram of an exemplary first method to control operation of a vehicle air compressor in accordance with the present disclosure.

FIG. 4 depicts a flow diagram of a first method 400 to control air compressor operation in accordance with the present disclosure. FIG. 4 may be described with continued reference to prior figures, including FIGS. 1-3. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include obtaining, by the processor 240, the trigger signal. As described above, the trigger signal may indicate to the processor 240 that the user desires to operate the air compressor 210. At step 406, the method 400 may include determining, by the processor 240, the tool specification and the expected tool usage characteristics based on inputs/information obtained from the sensor suite 214. At step 408, the method 400 may include calculating, by the processor 240, the first target pressure of compressed air in the storage tank 212 based on the tool specification and the expected tool usage characteristics. At step 410, the method 400 may include causing, by the processor 240, the air compressor operation to fill the storage tank 212 with the compressed air at the first target pressure.

The method 400 may end at step 412.

Figure 5:
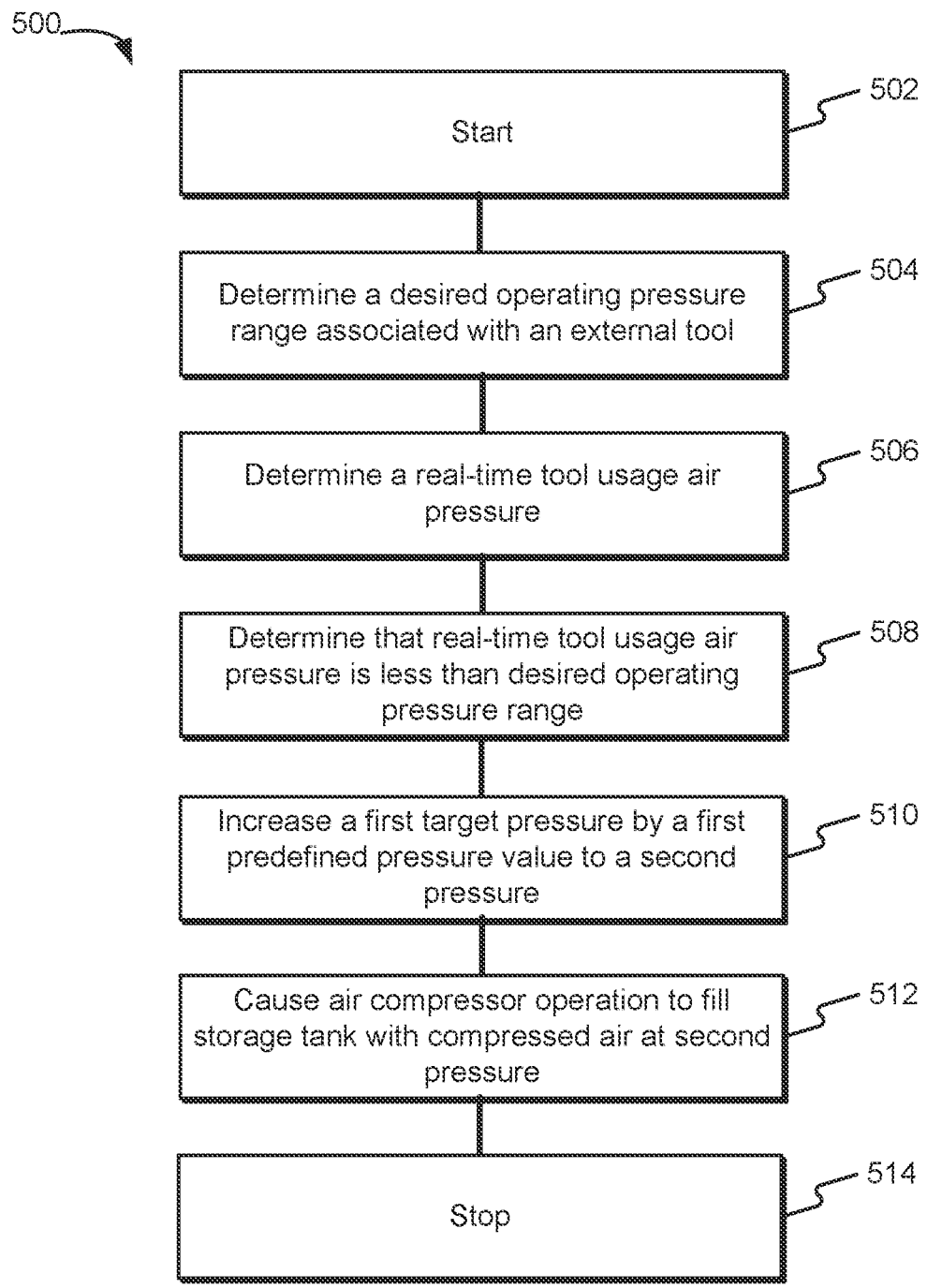
FIG. 5 depicts a flow diagram of an exemplary second method to control operation of a vehicle air compressor in accordance with the present disclosure.

FIG. 5 depicts a flow diagram of a second method 500 to control air compressor operation in accordance with the present disclosure. FIG. 5 may be described with continued reference to prior figures, including FIGS. 1-4. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 240, the desired operating pressure range associated with the external tool based on the tool specification and the expected tool usage characteristics (i.e., the operation being performed by the user by using the external tool). At step 506, the method 500 may include determining, by the processor 240, the real-time tool usage air pressure based on inputs obtained from the output valve pressure sensor 238. At step 508, the method 500 may include determining, by the processor 240, that the real-time tool usage air pressure may be less than the desired operating pressure range.

At step 510, the method 500 may include increasing, by the processor 240, the first target pressure by the first predefined pressure value to the second pressure, responsive to a determination that the real-time tool usage air pressure may be less the desired operating pressure range. At step 512, the method 500 may include causing, by the processor 240, the air compressor operation to fill the storage tank 212 with the compressed air at the second pressure.

The method 500 may end at step 514.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   an air compressor configured to supply compressed air;
   an air storage tank configured to receive the compressed air from the air compressor and store the compressed air, wherein the air storage tank is configured to supply the compressed air to at least a first external tool; and a processor communicatively coupled with the air compressor and the air storage tank, wherein the processor is configured to:

obtain a first trigger signal;

determine, responsive to obtaining the first trigger signal, a type of the first external tool and a time duration of use of the first external tool to perform a first task;

calculate a first target pressure of the compressed air in the air storage tank based on at least the time duration of use of the first external tool to perform the first task; and cause an air compressor operation to fill the air storage tank with compressed air at the first target pressure.

2. The vehicle of claim 1, further comprising:

a user interface configured to receive information associated with the first external tool from a user, the information comprising the type of the first external tool and the time duration of use of the first external tool to perform the first task.

3. The vehicle of claim 1, further comprising:

at least one of a vehicle camera, a radar sensor and a lidar sensor configured to obtain information associated with the first external tool, the information comprising the type of the first external tool.

4. The vehicle of claim 3, wherein the information associated with the first external tool comprises images of the first external tool.

5. The vehicle of claim 1, wherein the processor is further configured to:

determine an operating pressure associated with the first external tool for performing the first task; and calculate the first target pressure further based on adding a predefined first pressure to the operating pressure.

6. The vehicle of claim 1, wherein the processor is further configured to:

determine a desired operating pressure range associated with the first external tool for performing the first task;

increase the first target pressure by a first predefined pressure value to a second pressure, responsive to determining the desired operating pressure range; and cause the air compressor operation to fill the air storage tank with compressed air at the second pressure.

7. The vehicle of claim 1, wherein the processor is further configured to:

determine, responsive to obtaining a second trigger signal, a type of a second external tool and a time duration of use of the second external tool to perform a second task;

calculate a second target pressure of compressed air in the air storage tank at least based on the time duration of use of the second external tool to perform the second task being longer than the time duration of use of the first external tool to perform the first task; and cause the air compressor operation to fill the air storage tank with the compressed air at the second target pressure that is lower than the first target pressure.

8. The vehicle of claim 7, wherein the processor is further configured to:

determine an operating pressure associated with the second external tool for performing the second task; and calculate the second target pressure further based on subtracting a predefined second pressure to the operating pressure.

9. The vehicle of claim 1, wherein the processor is further configured to:

issue an alert notification based on determining that the first external tool is operating below a desired operating pressure range when the air compressor is operating at full capacity.

10. The vehicle of claim 1, wherein the processor is further configured to:

activate a vehicle light to illuminate in a first color based on determining that the first external tool is operating below a desired operating pressure range when the air compressor is operating at full capacity;

activate the vehicle light to illuminate in a second color based on determining that the first external tool is operating substantially close to the desired operating pressure range when the air compressor is operating at full capacity; and activate the vehicle light to illuminate in a third color based on determining that the first external tool is operating in the desired operating pressure range when the air compressor is operating at full capacity.

11. A method to operate an air compressor of a vehicle, the method comprising:

obtaining, by a processor, a trigger signal;

determining, by the processor, responsive to obtaining a first trigger signal, a type of a first external tool connected with an air storage tank and a time duration of use of the first external tool to perform a first task, wherein:

the air compressor is configured to supply compressed air, the air storage tank is configured to receive the compressed air from the air compressor and store the compressed air, and the air storage tank is configured to supply the compressed air to at least the first external tool;

calculating, by the processor, a first target pressure of the compressed air in the air storage tank based on at least the time duration of use of the first external tool to perform the first task; and causing, by the processor, air compressor operation to fill the air storage tank with the compressed air at the first target pressure.

12. The method of claim 11, further comprising at least one of a vehicle camera, a radar sensor and a lidar sensor configured to obtain information associated with the first external tool, the information comprising the type of the first external tool.

13. The method of claim 12, wherein the information associated with the first external tool comprises images of the first external tool.

14. The method of claim 11 further comprising:

determining an operating pressure associated with the first external tool for performing the first task; and calculating the first target pressure further based on adding a predefined first pressure to the operating pressure.

15. The method of claim 11 further comprising:

determining a desired operating pressure range associated with the first external tool for performing the first task;

increasing the first target pressure by a first predefined pressure value to a second pressure, responsive to determining the desired operating pressure range; and causing the air compressor operation to fill the air storage tank with compressed air at the second pressure.

16. The method of claim 11, further comprising:

determining, by the processor, responsive to obtaining a second trigger signal, a type of a second external tool and a time duration of use of the second external tool to perform a second task;

calculating a second target pressure of compressed air in the air storage tank at least based on the time duration of use of the second external tool to perform the second task being longer than the time duration of use of the first external tool to perform the first task; and causing the air compressor operation to fill the air storage tank with the compressed air at the second target pressure that is lower than the first target pressure.

17. The method of claim 16, further comprising:

determining an operating pressure associated with the second external tool for performing the second task; and calculating the second target pressure further based on subtracting a predefined second pressure to the operating pressure.

18. The method of claim 11, further comprising:

issuing an alert notification based on determining that the first external tool is operating below a desired operating pressure range when the air compressor is operating at full capacity.

19. The method of claim 11, further comprising:

activating a vehicle light to illuminate in a first color based on determining that the first external tool is operating below a desired operating pressure range when the air compressor is operating at full capacity;

activating the vehicle light to illuminate in a second color based on determining that the first external tool is operating substantially close to the desired operating pressure range when the air compressor is operating at full capacity; and activating the vehicle light to illuminate in a third color based on determining that the first external tool is operating in the desired operating pressure range when the air compressor is operating at full capacity.

20. A non-transitory computer-readable storage medium having instructions stored thereupon which, when executed by a processor, cause the processor to:

obtain a trigger signal;

determine, responsive to obtaining a first trigger signal, a type of a first external tool connected with an air storage tank and a time duration of use of the first external tool to perform a first task, wherein the air storage tank is configured to receive compressed air from an air compressor, and the compressed air, and supply the compressed air to at least the first external tool;

calculate a target pressure of the compressed air in the air storage tank based on at least the time duration of use of the first external tool to perform the first task; and cause an air compressor operation to fill the air storage tank with the compressed air at the target pressure.

* * * * *